US012480620B2

(12) United States Patent
Maness et al.

(10) Patent No.: US 12,480,620 B2
(45) Date of Patent: Nov. 25, 2025

(54) INERT GAS BACKUP SYSTEM FOR AIR COMPRESSORS

(71) Applicant: Vanzandt Controls, LLC, Odessa, TX (US)

(72) Inventors: Don Maness, Fort Worth, TX (US); Brad Tipps, Fort Worth, TX (US)

(73) Assignee: Vanzandt Controls, LLC, Odessa, TX (US)

( * ) Notice: Subject to any disclaimer, the term of this patent is extended or adjusted under 35 U.S.C. 154(b) by 43 days.

(21) Appl. No.: 18/592,139

(22) Filed: Feb. 29, 2024

(65) Prior Publication Data

US 2025/0277562 A1 Sep. 4, 2025

(51) Int. Cl.
*F17C 9/00* (2006.01)
*G08B 21/18* (2006.01)

(52) U.S. Cl.
CPC .............. *F17C 9/00* (2013.01); *G08B 21/182* (2013.01); *F17C 2201/0109* (2013.01); *F17C 2205/0142* (2013.01); *F17C 2205/0326* (2013.01); *F17C 2221/012* (2013.01); *F17C 2221/013* (2013.01); *F17C 2221/014* (2013.01); *F17C 2221/016* (2013.01); *F17C 2221/017* (2013.01); *F17C 2227/0157* (2013.01); *F17C 2250/032* (2013.01); *F17C 2250/043* (2013.01); *F17C 2250/0636* (2013.01)

(58) Field of Classification Search
None
See application file for complete search history.

(56) References Cited

U.S. PATENT DOCUMENTS

| 2017/0023180 | A1* | 1/2017 | Petit ..................... F16K 15/023 |
| 2017/0159611 | A1* | 6/2017 | Porter ........................ F17C 9/02 |
| 2021/0088184 | A1* | 3/2021 | Poorman ................... F17C 5/06 |
| 2021/0317952 | A1* | 10/2021 | Allidieres ................ F17C 5/06 |

* cited by examiner

*Primary Examiner* — Paul J Gray
(74) *Attorney, Agent, or Firm* — Bradley Arant Boult Cummings LLP; Stephen H. Hall

(57) ABSTRACT

The present disclosure provides backup systems for air compressors. The systems can detect an air compressor failure and/or low instrument air pressure and activate a backup inert gas power source to maintain functionality of compressed air-powered pneumatic devices at a wellsite. The backup systems can provide a working fluid in the form of an inert gas to the compressed air-powered pneumatic devices.

13 Claims, 5 Drawing Sheets

INERT GAS BACKUP SYSTEM FOR AIR COMPRESSORS

TECHNICAL FIELD

The present invention relates generally to backup systems for air compressors, and more particularly, to back up systems that utilize inert gas as a power source.

BACKGROUND

Pneumatic devices are widely used in the oil and gas industry. The three main types of pneumatic devices used in the oil and gas industry are pneumatic controllers, which control conditions such as levels, temperatures, and pressure, pneumatic pumps/valves, which inject chemicals into wells and pipelines or circulate dehydrator fluids, and pneumatic valve actuators. These pneumatic devices are powered by gas pressure and are mainly used where electrical power is not available. For instance, FIG. 1 depicts a traditional wellhead system 50 having a pneumatic control system powered by natural gas. The pneumatic control system includes process control instruments and valves that are operated by natural gas. As shown in FIG. 1, a main supply line 1 uses a natural gas byproduct of oil to pressurize and activate valves 2. The valves 2 are powered and controlled by natural gas pressure from the main supply line 1.

While pneumatic devices are essential to the oil and gas industry, these devices, when powered using natural gas, can be one of the largest sources of methane emissions in petroleum and natural gas supply chains. Because these pneumatic devices are powered by natural gas, they emit methane and other pollution upon actuation. Methane emissions are harmful to the environment and can be more potent than carbon dioxide in trapping heat in the atmosphere. Indeed, methane is a much more potent warming agent than carbon dioxide, trapping 87 times more heat in the earth's atmosphere in the first twenty years after it is released (on a pound-for-pound basis).

The recently enacted Inflation Reduction Act (IRA) contains several new provisions related to methane emissions impacting oil and gas companies. Companies who already report emissions to the U.S. Environmental Protection Agency's (EPA) Greenhouse Gas Emissions Reporting Program under the Clean Air Act are likely to face stiff new charges starting in 2025, unless they reduce their emissions below the 25,000 metric tons of carbon dioxide equivalent threshold. Central to the new "Methane Emissions Reduction Program" in the IRA is the methane emissions charge, which the IRA authorizes the EPA to collect from certain entities in the oil and natural gas sector starting in 2024. The methane emissions charge will start at $900 per metric ton of methane emitted in 2024 and increase to $1,200 in 2025 and $1,500 in 2026. As such, there is an ever-increasing focus by oil and gas producers to reduce methane emissions through the development of new technologies and processes.

Methods of reducing methane emissions from pneumatic devices range from preventing emissions, to reducing emissions, to repairing those devices with emissions that are higher than expected. For example, to reduce methane and carbon emissions, many companies have converted their natural gas-powered pneumatic control systems to compressed instrument air systems. Instrument air systems substitute compressed air for the pressurized natural gas, eliminating methane emissions and providing additional safety benefits.

While instrument air systems provide significant economic and environmental benefits, these systems can only be used in locations with access to a sufficient and consistent supply of electrical power. Indeed, instrument air systems rely on the use of electrical power. When electrical power is lost at a wellsite, the air compressor systems will stop working. For instance, if grid power is lost at the wellsite, AC air compressor systems will stop working. Similarly, if there is not sufficient sunshine and a loss in solar power, DC air compressor systems can fail. Some companies have installed redundant air compressors at the wellsite in the event power is lost at the primary air compressor. However, regardless of redundancy, the backup air compressors cannot operate without electrical power. If no compressed air is available, the well will automatically shut off and stop producing oil and gas.

Accordingly, there remains a need in the art for a backup system for operating a wellsite in the event of a power failure or emergency shutdown of a compressed instrument air system.

SUMMARY

The problems expounded above, as well as others, are addressed by the following inventions, although it is to be understood that not every embodiment of the inventions described herein will address each of the problems described above.

In some embodiments, a compressed air-powered system is provided, the system including an air compressor operatively connected to a conduit, the air compressor configured to transmit compressed air through the conduit; an inert gas supply unit operatively connected to the conduit by a gas supply line, wherein the inert gas supply unit includes a volume of inert gas; a valve disposed on the gas supply line, the valve being operable between an open position and a closed position; a controller having a processor and a memory, wherein the controller is in communication with the air compressor and the valve and the controller is configured to interpret an operational status of the air compressor as active or inactive, wherein, in response to interpreting the operational status of the air compressor as inactive, the controller is configured to generate a signal to move the valve to the open position to allow inert gas to flow from the inert gas supply unit.

In one embodiment, the controller is a programmable logic controller (PLC), a remote telemetry unit (RTU), a flow computer, or any combination thereof. In another embodiment, the system further includes a pressure sensor operatively connected to the air compressor and the controller, wherein the pressure sensor is configured to transmit a pressure measurement of the compressed air to the controller. In still another embodiment, the controller is configured to interpret the operational status of the air compressor as inactive when the pressure measurement of the compressed air is below an active pressure set point. In yet another embodiment, the inert gas is selected from the group consisting of nitrogen gas, helium gas, neon gas, argon gas, carbon dioxide, hydrogen, and any combination of the foregoing. For instance, the inert gas may be nitrogen gas. In another embodiment, the controller is configured to interpret an operational status of the air compressor as in alert mode when the pressure measurement of the compressed air is below the active pressure set point and above a critically low pressure set point. In still another embodiment, in response to interpreting the operational status of the air compressor as in alert mode, the controller is configured to transmit an alert to an operator of the system. In yet another embodiment, the system includes a human-machine interface (HMI) operatively connected to the controller. In one embodiment, the valve is a solenoid valve.

In further embodiments, a compressed air-powered system is provided, the system including an air compressor operatively connected to a conduit, the air compressor configured to transmit compressed air through the conduit; an inert gas supply unit operatively connected to the conduit by a gas supply line, wherein the inert gas supply unit includes a volume of inert gas; a valve disposed on the gas supply line, the valve being operable between an open position and a closed position; a controller having a processor and a memory, wherein the controller is in communication with the air compressor and the valve and the controller is configured to interpret an operational status of the air compressor as in an alert mode or an inactive mode, wherein: in response to interpreting the operational status of the air compressor as in the alert mode, the controller is configured to transmit an alert, and in response to interpreting the operational status of the air compressor as in the inactive mode, the controller is configured to generate a signal to move the valve to the open position to allow inert gas to flow from the inert gas supply unit.

In one embodiment, the controller is configured to interpret the operational status of the air compressor as in the alert mode when a pressure measurement of the compressed air is below an active pressure set point and above a critically low pressure set point. In another embodiment, the controller is configured to interpret the operational status of the air compressor as in the inactive mode when the pressure measurement of the compressed air is below the critically low pressure set point. In still another embodiment, the system further includes a second inert gas supply unit operatively connected to the conduit by a gas supply line, the second inert gas supply unit configured to allow inert gas to flow therefrom when the inert gas supply unit is empty. In yet another embodiment, the system further includes a pressure sensor operatively connected to the air compressor and the controller, wherein the pressure sensor is configured to transmit a pressure measurement of the compressed air to the controller.

In still further embodiments, a method for operating a compressed air-powered system is provided, the method including operating an air compressor to transmit compressed air through a conduit; interpreting, with a controller, an operational status of the air compressor as active or inactive; in response to interpreting the operational status of the air compressor as inactive, generating a signal to open a valve disposed on an inert gas supply unit operatively connected to the conduit to allow inert gas to flow from the inert gas supply unit. The method may further include measuring a pressure of the compressed air and transmitting the pressure of the compressed air to the controller. In another embodiment, the method may further include interpreting the operational status of the air compressor as inactive when the pressure of the compressed air is below an active pressure set point. In still another embodiment, the inert gas is selected from the group consisting of nitrogen gas, helium gas, neon gas, argon gas, carbon dioxide, hydrogen, and any combination of the foregoing. For instance, the inert gas may be nitrogen gas, helium gas, neon gas, argon gas, or any combination of the foregoing.

BRIEF DESCRIPTION OF THE DRAWINGS

Further features and advantages can be ascertained from the following detailed description that is provided in connection with the drawings described below.

DETAILED DESCRIPTION

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given element of the disclosed embodiments of the invention may be embodied in a single structure, a single step, a single substance, or the like. Similarly, a given element of the disclosed embodiment may be embodied in multiple structures, steps, substances, or the like.

The present disclosure provides backup systems for air compressors that utilize inert gas as a power source. The systems of the present disclosure can detect an air compressor failure and/or low instrument air pressure and activate a backup inert gas power source to maintain functionality of compressed air-powered pneumatic devices at a wellsite. The backup systems described herein can provide a working fluid in the form of an inert gas to the compressed air-powered pneumatic devices, which allows the wellsite to continue to operate until the air compressor(s) can be repaired.

Figure 1:
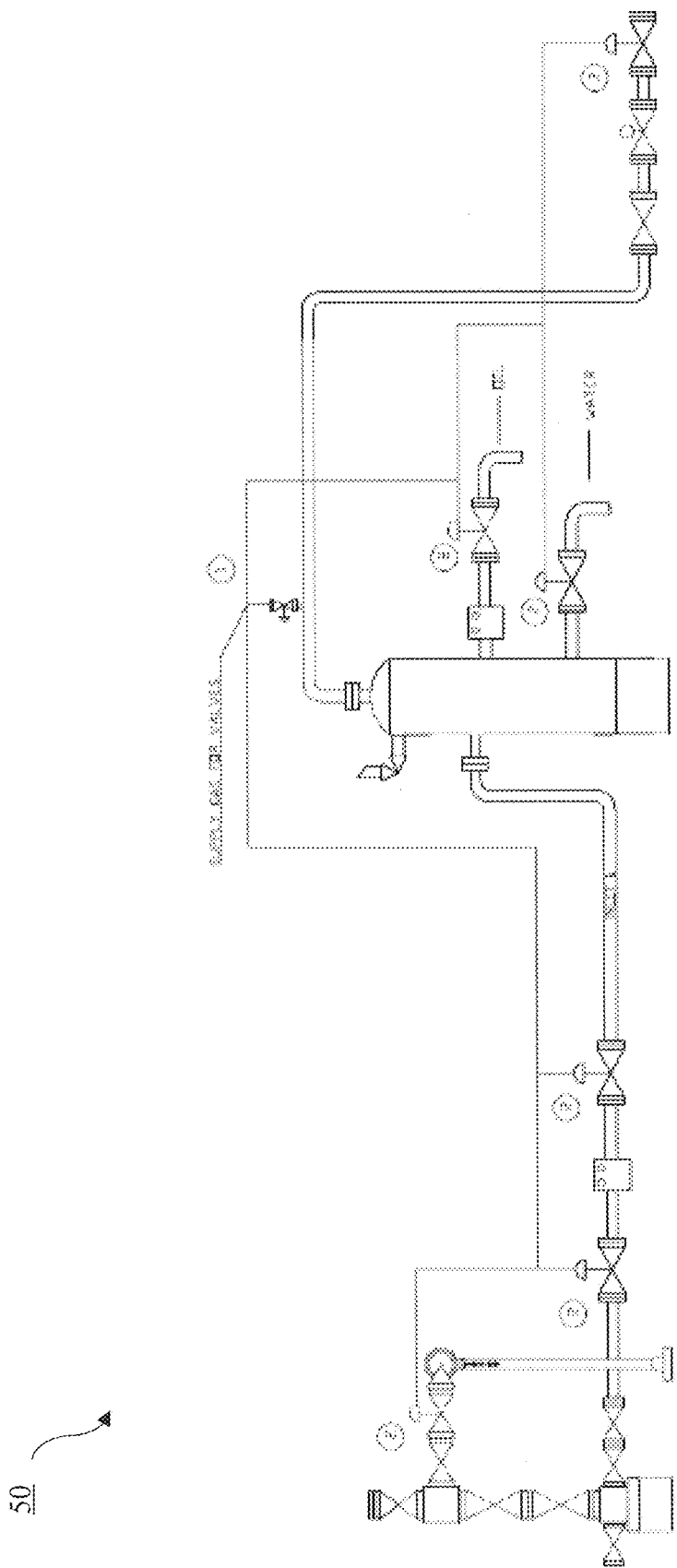
FIG. 1 is a schematic illustration of a traditional wellhead system having a pneumatic control system powered by natural gas.
Figure 2:
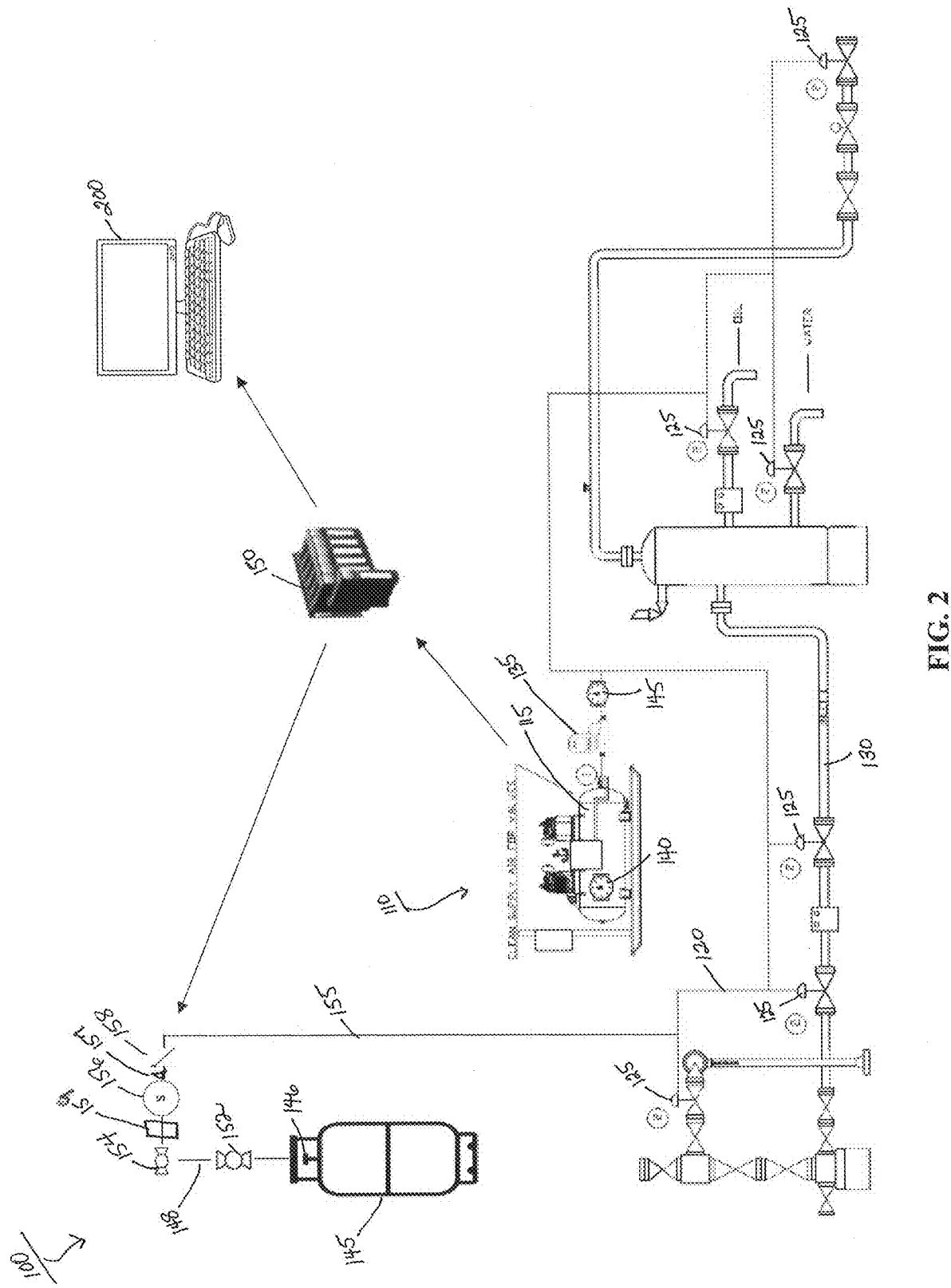
FIG. 2 is a schematic illustration of an inert gas backup system for operating a compressed air-powered pneumatic system in accordance with one embodiment of the present disclosure.

Referring to FIG. 2, a schematic diagram of a compressed air-powered pneumatic system 110 with an inert gas backup system 100 according to one embodiment of the present disclosure is illustrated. As used herein, "compressed air" is defined as free air that has been compressed into a volume that is smaller than the volume the air normally occupies at normal atmospheric pressure. Controlled expansion of the compressed air can be used as a source of power to operate a wide range of pneumatically powered valves and tools, including, for example, pneumatic controllers, pumps/valves, valve actuators, and separators.

The compressed air-powered pneumatic system 110 includes at least one compressed air source in the form of an air compressor 115. The air compressor 115 is operatively connected to a pneumatically operated valve 125 that regulates the flow of a fluid, such as water, oil, gas, or steam, in a pipeline 130. Compressed air is supplied from the air compressor 115 and piped through a distribution system 120 to the pneumatically operated valve 125. The distribution system 120 can be comprised of one or more instrument air lines or pipes configured for delivering the compressed air to the pneumatically operated valve 125. The pneumatically operated valve 125 includes a controllable valve element (not shown) disposed to selectively regulate the flow of the fluid through the pipeline 130. The controllable valve element in the pneumatically operated valve 125 uses the power of the compressed air to open, close, or regulate the flow of the fluid within the pipeline 130. While six pneumatically operated valves 125 are exemplified in FIG. 2, one of ordinary skill in the art will appreciate that any number of pneumatically operated valves may be used with the system of the present disclosure. For instance, the compressed air-powered pneumatic system 110 may include a single pneumatically operated valve 125 or a plurality of pneumatically operated valves 125.

The air compressor 115 may be any type of compressor used for instrument air delivery. For example, the air compressor 115 may be a centrifugal (rotary screw) compressor. In further embodiments, the air compressor 115 may be a reciprocating piston (positive displacement) compressor. The size of the air compressor 115 may depend on the size of the facility, the number of control devices operated by the system, and the typical bleed rates of these devices. In some embodiments, the air compressor 115 is powered by electric power. For instance, the air compressor 115 may be powered by one or more batteries. In another embodiment, the air compressor 115 may be powered by an electrical outlet. In still another embodiment, the air compressor 115 may be powered by solar power. In this embodiment, the air compressor 115 can be powered by solar power cells that actuate the air compressor 115 using electric power. In the illustrated embodiment, a single air compressor 115 is shown. However, as will be appreciated by those skilled in the art, the compressed air-powered pneumatic system 110 may include a plurality of air compressors 115 depending on the number of valves and devices to be powered.

The air compressor 115 may include a pressure sensor 140. The pressure sensor 140 is configured to measure the pressure of the compressed air passing through the distribution system 120. In some embodiments, the pressure sensor 140 is operatively connected to the air compressor 115 to measure the pressure of the compressed air precisely and accurately. The pressure sensor 140 can monitor any drop in pressure during operation of the air compressor 115. In further embodiments, the compressed air-powered pneumatic system 110 may also include a temperature sensor 145. The temperature sensor 145 is configured to measure the temperature of the compressed air. In some embodiments, the temperature sensor 145 is operatively connected to the pipeline 130 such that the temperature sensor 145 can precisely and accurately measure the temperature of the compressed air.

The compressed air-powered pneumatic system 110 also includes a flow measurement device 135. In some embodiments, the flow measurement device 135 is a device configured to measure a mass or volume flow rate of the compressed air passing through the distribution system 120. The flow measurement device 135 is operatively connected to the distribution system 120 such that the flow measurement device 135 can precisely and accurately measure the flow rate of the compressed air. The flow measurement device 135 may measure the flow rate of the compressed air upstream of the pneumatically operated valve 125. In other embodiments, the flow measurement device 135 may measure the flow rate of the compressed air downstream of the pneumatically operated valve 125.

In some embodiments, the flow measurement device 135 is a flow meter. For example, the flow measurement device 135 may be a mass flow meter that provides for precise measurement of gas mass flow. In another embodiment, the flow measurement device 135 may be a volumetric flow meter. Mass flow rate measures mass per unit time, differing from volumetric flow rate-which measures volume per unit time. In further embodiments, the flow measurement device 135 may be an ultrasonic flow meter capable of detecting the velocity of a flow in a calibrated tube through doppler shift or time of flight type measurements. In still further embodiments, the flow measurement device 135 may be a pressure differential type, a Coriolis type, a vortex shedding type, a hot wire type, or any other type of flow meter known in the art.

As illustrated in FIG. 2, the compressed air-powered pneumatic system 110 also includes the inert gas backup system 100. The inert gas backup system 100 is intended to serve as a backup power supply for the wellsite in the event the air compressor 115 malfunctions or electric power to the air compressor 115 is lost. As will be described in detail below, in response to an indication that the pressure of the compressed air flow is below a set point, the inert gas backup system 100 is configured to supply an inert gas to the distribution system 120 as a working fluid to operate the pneumatic devices, such as the pneumatically operated valves 125.

The inert gas backup system 100 includes an inert gas supply unit 145. The inert gas supply unit 145 can be any type of container, tank, or pressure vessel having an inner volume configured to store an inert gas. As used herein, the term "inert gas" refers to a gas that does not readily undergo chemical reactions with other chemical substances and therefore does not readily form chemical compounds. Advantageously, inert gas is readily available and can be safely put into instrument air lines without the fear of explosion. The inert gas can be, for example, nitrogen gas, helium gas, neon gas, argon gas, carbon dioxide, hydrogen, or any combination of the foregoing. In one embodiment, the inert gas is nitrogen gas. In another embodiment, the inert gas is argon gas. In still another embodiment, the inert gas is helium gas. In yet another embodiment, the inert gas can be carbon dioxide, although carbon dioxide may not be desired since it can increase emissions at the wellsite. In further embodiments, the inert gas can be a mixture of any of the gases listed above. In one embodiment, the inert gas can be a mixture of nitrogen, argon, and carbon dioxide gases.

The inert gas supply unit 145 includes a nozzle 146 in fluid communication with a first gas supply line 148. The first gas supply line 148 supplies inert gas from the inert gas supply unit 145 to a main gas supply line 155 that is operatively connected to the distribution system 120. As shown in FIG. 2, the nozzle 146 is operatively connected to a first valve 152. The first valve 152 is configured to control a supply of inert gas from the inert gas supply unit 145. In this embodiment, the first valve 152 is in an open position in which the nozzle 146 of the inert gas supply unit 145 allows inert gas to flow into the first gas supply line 148. A second valve 154 operatively connects the first gas supply line 148 to the main gas supply line 155. The second valve 154 is configured to control the supply of inert gas into the main supply line 155 from the first gas supply line 148. In this aspect, the second valve 154 is in an open position which allows inert gas from the first gas supply line 148 to flow into the main gas supply line 155. Each of the first and second valves 152, 154 can include an electric actuator or an electric motor configured to be driven to transition the valves 152, 154 between open and closed positions. However, for purposes of the present disclosure, the first and second valves 152, 154 are intended to remain open.

The main gas supply line 155 is fluidly coupled to the distribution system 120. In some embodiments, a pressure transmitter 159 is operatively connected to the main gas supply line 155. The pressure transmitter 159 is configured to measure the pressure of the inert gas and transmit the pressure measurements to the controller 150. As illustrated in FIG. 2, the main gas supply line 155 also includes a solenoid valve 156 operatively connected thereto. The solenoid valve 156 is configured to control the flow of the inert gas to the distribution system 120. The solenoid valve 156, when electrically energized or de-energized, can either shut off or allow the inert gas to flow through the main gas supply line 155. The solenoid valve 156 includes an actuator that takes the form of an electromagnet. When energized, a magnetic field builds up which pulls a plunger or pivoted armature against the action of a spring, causing it to open or close the solenoid valve. This movement allows the inert gas to pass through the valve or prevents its flow, respectively. When de-energized, the plunger or pivoted armature is returned to its original position by the spring action. Any solenoid valve known in the art can be used with the present disclosure.

In some embodiments, the main gas supply line 155 may also include a check valve 158 operatively connected thereto. The check valve 158, also known as a one-way valve, is configured to allow the flow of the inert gas to move only in one direction. The primary purpose of the check valve 158 is to prevent backflow in the system. That is, the check valve 158 is configured to prevent a backflow of the inert gas into the main gas supply line 155 after it flows to the distribution system 120. Any check valve known in the art can be used with the present disclosure. In further embodiments, a regulator 157 is operatively connected to the main gas supply line 155. The regulator 157 may be positioned between the solenoid valve 156 and the check valve 158. The regulator 157 is configured to reduce the pressure of the inert gas down to a working pressure that can be used in the pneumatic system 110.

The valves on the main gas supply line 155 and the first gas supply line 148, including, for example, the first valve 152, the second valve 154, and the solenoid valve 156, each include an electric actuator configured to receive control signals from a controller 150 and use the control signals to transition between open and closed positions, and hence, activate the inert gas backup system 100. The controller 150 is operatively and communicatively coupled to the air compressor 115 and the pressure sensor 140 as well as the valves on the main gas supply line 155 and the first gas supply line 148, including, for example, the first valve 152, the second valve 154, and the solenoid valve 156. The controller 150 receives and interprets system information from the air compressor 115 and communicates with the valves on the main gas supply line 155 and the first gas supply line 148. The controller 150 may be any controller that conforms to IEC61131.5 programming language and includes a Modbus interface.

Figure 5:
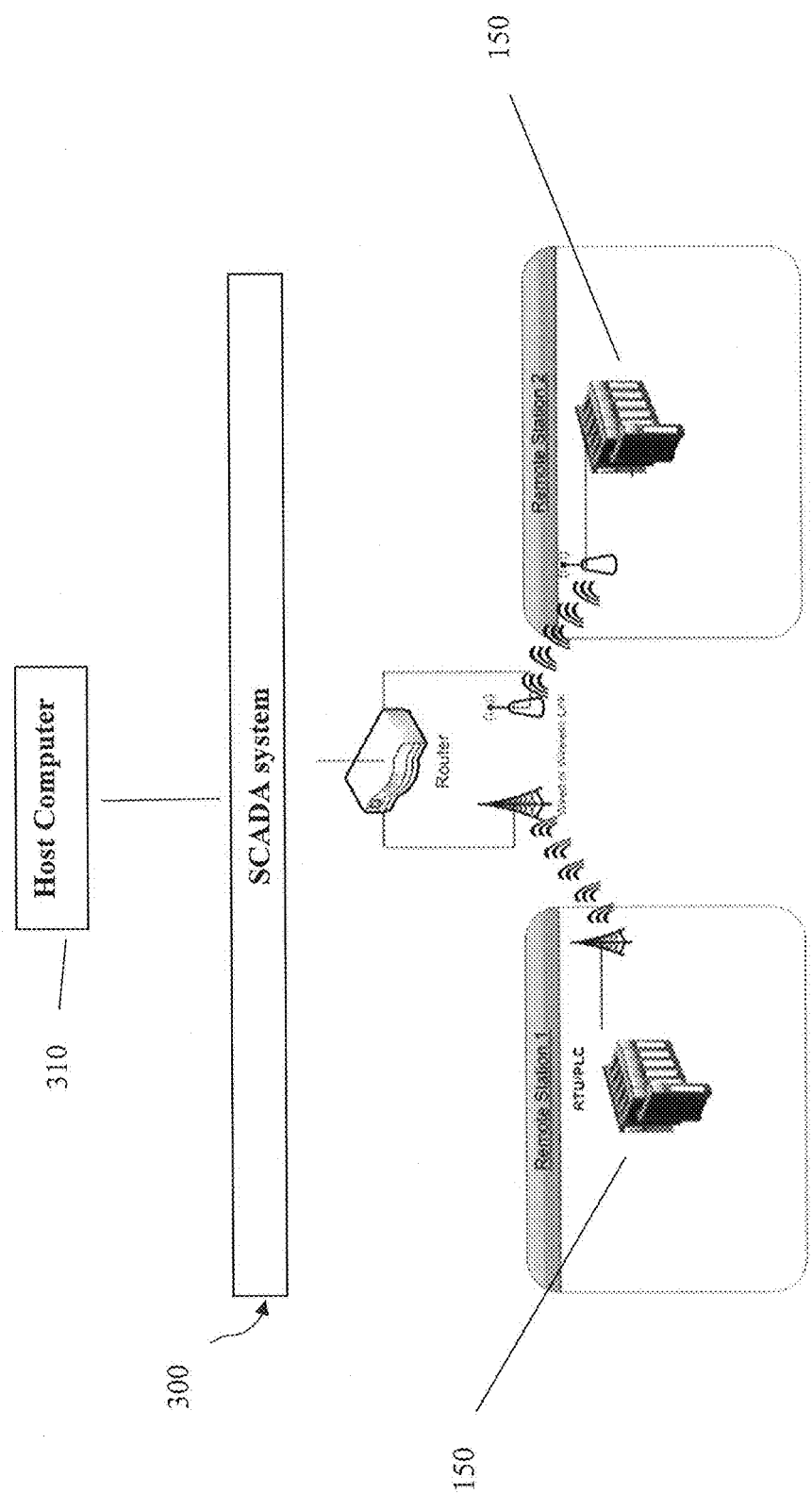
FIG. 5 is a schematic diagram of a SCADA system according to one embodiment of the present disclosure.

In some embodiments, the controller 150 may be a programmable logic controller (PLC), a flow computer, or a remote telemetry unit (RTU). In one embodiment, the controller 150 is a programmable logic controller (PLC). A PLC is a specialized computer control system configured to execute software which continuously gathers data on the state of input devices to control the state of output devices. A PLC typically includes a processor (which may include volatile memory), volatile memory including an application program, and one or more input/output (I/O) ports for connecting to other devices in the automation system. As will be described in more detail below, the PLC can be paired with a Human Machine Interface (HMI) 200 (as shown in FIG. 2) or Supervisory, Control and Data Acquisition (SCADA) systems (as shown in FIG. 5).

In further embodiments, the controller 150 is a remote telemetry unit (RTU). A RTU is a device that is used for remote monitoring and control of field devices within an automated industrial process. The RTU may be used to store and transmit flow information as part of a remote SCADA network. In still further embodiments, the controller 150 may be a PLC module providing an integrated PLC, RTU, and flow computer solution. In this embodiment, the flow computer module can use its onboard, high-speed processor for flow calculations and memory for data archiving. The module can read the input information (pressure, temperature, etc.) directly from the PLC over its high-speed backplane. The archived data within the flow computer module's memory is available to the SCADA network via the Modbus protocol.

In one embodiment, the controller 150 is configured to receive signals from one or more sensors to monitor and interpret an operational status of the air compressor 115. In this embodiment, the controller 150 is communicatively coupled to the air compressor 115 and monitors the operational status of the air compressor 115. The controller 150 is configured to monitor the operational status of the air compressor 115 continuously. This allows the controller 150 to detect a problem, such as an air compressor failure and/or low instrument air pressure, instantaneously.

In one embodiment, the pressure sensor 140 is capable of sensing the amount of pressure within a volume of air and outputting a signal indicative of the measured pressure to the controller 150. Based on the signal of the measured pressure, the controller 150 can determine the operational status of the air compressor 115. For example, in one embodiment, the controller 150 may determine if the air compressor 115 is in an active mode, an alert mode, or an inactive mode.

The controller 150 may determine that the operational status of the air compressor 115 is in an active mode and operating normally when the air compressor 115 is transmitting compressed air at or above an active pressure set point. The active pressure set point will depend on the device being powered by the air compressor and the amount of pressure required to operate the device. For example, to operate the pneumatically operated valves 125 shown in FIG. 2, the active pressure set point may range from about 50 PSI to about 70 PSI, preferably from about 60 PSI to about 70 PSI, and more preferably about 70 PSI.

In another embodiment, the controller 150 may determine that the operational status of the air compressor 115 is in an alert mode when the air compressor 115 is transmitting air below the active pressure set point, but above a critically low pressure set point. In this embodiment, the controller 150 can be configured to communicate an alert to an operator of the compressed air-powered pneumatic system 110 to indicate a potential malfunction with the air compressor 115 and/or the electric power source. The alert can be a signal, such as an audio, text, or visual alert, that indicates a drop in pressure of the air flow. The alert mode gives the operator time to troubleshoot the malfunction and potentially fix it before having to activate the inert gas backup system 100. In some embodiments, to operate the pneumatically operated valves 125 shown in FIG. 2, the air compressor 115 may enter the alert mode when the pressure of the air flow is about 40 PSI to about 50 PSI.

In still another embodiment, the controller 150 may determine that the operational status of the air compressor 115 is in an inactive mode when the air compressor 115 is transmitting compressed air at or below the critically low pressure set point. Like the active pressure set point, the critically low pressure set point will depend on the pneumatic device(s) being powered by the air compressor. In some embodiments, to operate the pneumatically operated valves 125 shown in FIG. 2, the critically low pressure set point may be about 40 PSI or less. For instance, the critically low pressure set point may be about 30 PSI or less. In another embodiment, the critically low pressure set point may be about 20 PSI or less. In still further embodiments, the critically low pressure set point may be about 5 PSI or less. In yet another embodiment, the air compressor 115 may be determined to be in the inactive mode when the air compressor 115 fails to transmit air (for example, the pressure level is at or around zero).

The controller 150 may be programmed to activate the inert gas backup system 100 when the operational status of the air compressor 115 is determined to be in the alert mode or the inactive mode. In some embodiments, it may be desirable to activate the inert gas backup system 100 when the air compressor 115 is in the alert mode and still transmitting air. In this embodiment, the inert gas backup system 100 may be activated to supply inert gas as a supplement to the compressed air. For example, for air compressors powered by solar batteries, it generally is not advisable to allow solar batteries to fully operate under a certain charge. Thus, in these instances, the inert gas backup system 100 can be activated as a supplemental power source. In further embodiments, when the air compressor 115 reaches the inactive mode, the controller 150 may be programmed to turn off the air compressor 115 (in the event it is still transmitting air) and activate the inert gas backup system 100 to supply inert gas as the sole power source.

When the controller 150 receives a signal from the pressure sensor 140 and determines that the inert gas backup system 100 is to be activated, the controller 150 generates and transmits a control signal to the valves on the main gas supply line 155 and the first gas supply line 148, including, for example, the solenoid valve 156. In this embodiment, the controller 150 transmits an electronic control signal to the electric actuator on the solenoid valve 156 to move the valve to an open position. This allows for the inert gas to flow from the inert gas supply unit 145 and into the first gas supply line 148. The inert gas can then flow into the main supply line 155 through the second valve 154 and the solenoid valve 156. The check valve 158 can prevent any backflow of the inert gas.

In one embodiment, the inert gas supply unit 145 may continue to supply inert gas to the compressed air-powered pneumatic system 110 for a predetermined amount of time. For instance, the controller 150 may be programmed to allow the inert gas supply unit 145 to supply inert gas for a certain time period. At the end of the predetermined time period, the controller 150 can transmit an electronic control signal to the electric actuator on the solenoid valve 156 to move the valve to a closed position to stop the flow of inert gas. In another embodiment, the inert gas supply unit 145 may supply inert gas to the compressed air-powered pneumatic system 110 until the operational status of the air compressor 115 returns to the active mode. That is, the inert gas supply unit 145 may supply inert gas until the pressure sensor 140 indicates that the air flow from the air compressor 115 is at or above the active pressure set point. At this point, the controller 150 can transmit an electronic control signal to the electric actuator on the solenoid valve 156 to move the valve to a closed position to stop the flow of inert gas.

In some embodiments, the system 100 of the present disclosure includes a human-machine interface (HMI) 200. An HMI is a user interface or dashboard that connects a person to a machine, system, or device. In one embodiment, the HMI 200 communicates with the controller 150 to receive and display information related to the compressed air-powered pneumatic system 110. For instance, the HMI 200 can be used to visually display, track, and/or monitor data relating to the pressure measurements and the operational status of the air compressor 115. The HMI 200 can also be used to visually display one or more alerts when the air compressor 115 enters the alert mode.

Figure 3:
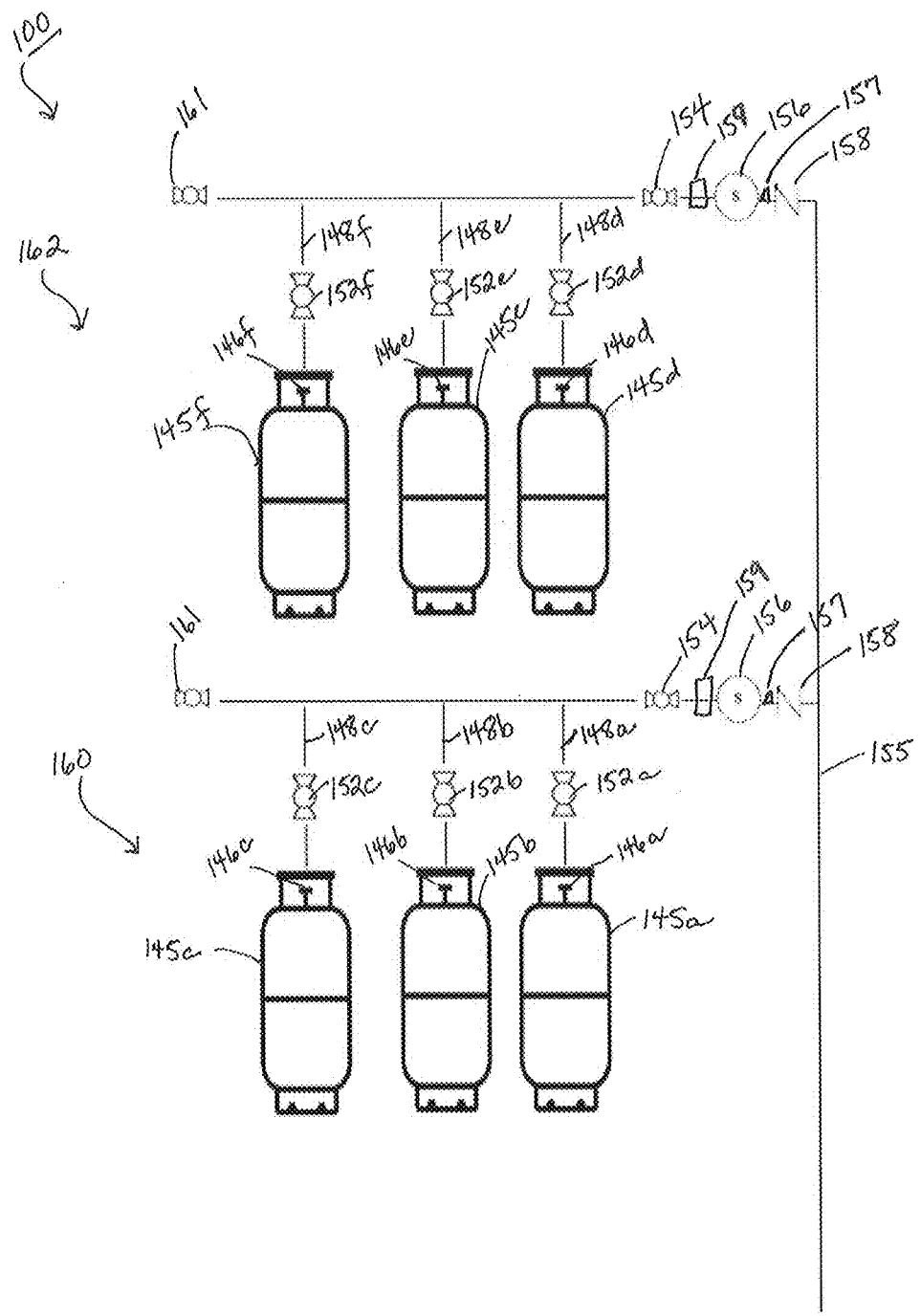
FIG. 3 is a schematic illustration of an inert gas backup system for operating a compressed air-powered pneumatic system in accordance with another embodiment of the present disclosure.

FIG. 3 shows the inert gas backup system 100 in accordance with another embodiment of the present disclosure. In this embodiment, the inert gas backup system 100 can include more than one inert gas supply unit. As shown in FIG. 3, multiple inert gas supply units 145a-145f can be operatively connected to the compressed air-powered pneumatic system 110 via the main gas supply line 155. This embodiment is particularly advantageous for compressed air-powered pneumatic systems that require the air compressor(s) to supply a large volume of compressed air to a number of different pneumatic devices.

In the illustrated embodiment, the main gas supply line 155 can extend to two supply banks: a first supply bank 160 and a second supply bank 162. The first supply bank 160 is comprised of three inert gas supply units 145a, 145b, 145c. Each inert gas supply unit 145a, 145b, 145c includes a nozzle (represented by 146a, 146b, and 146c, respectively) that is in fluid communication with a respective gas supply line 148a, 148b, 148c. The second supply bank 162 is also comprised of three inert gas supply units 145d, 145e, 145f. Each inert gas supply unit 145d, 145c, 145f includes a nozzle (represented by 146d, 146e, and 146f, respectively) that is in fluid communication with a respective gas supply line 148*d*, 148*e*, 148*f*. In some embodiments, each of the first supply bank 160 and the second supply bank 162 includes a refill valve 161. The refill valve 161 can be used to refill each of the supply banks on site with inert gas.

The nozzles 146*a*, 146*b*, and 146*c* on each of the inert gas supply units 145*a*, 145*b*, 145*c* are operatively connected to respective valves 152*a*, 152*b*, and 152*c*. The valves 152*a*-152*c* are configured to control a supply of inert gas from each of the inert gas supply units 145*a*-145*c*. Similarly, the nozzles 146*d*, 146*e*, and 146*f* on each of the inert gas supply units 145*d*, 145*c*, 145*f* are operatively connected to respective valves 152*d*, 152*e*, and 152*f*. The valves 152*d*-152*f* are configured to control a supply of inert gas from each of the inert gas supply units 145*d*-145*f*. In this embodiment, each valve 152*a*-152*f* is in an open position in which the nozzle of the respective inert gas supply unit allows inert gas to flow into the gas supply line.

In operation, when the controller 150 determines that the inert gas backup system 100 is to be activated, the controller 150 can transmit a control signal to the valves on the main gas supply line 155 that are operatively connected to the first supply bank 160 to transition to the open position. In this embodiment, the controller 150 can transmit an electronic control signal to open the solenoid valve 156. This, in turn, allows inert gas to flow from any one of the inert gas supply units 145*a*-145*c* in the first supply bank 160. For instance, the first inert gas supply unit 145*a* allows inert gas to flow until the first inert gas supply unit 145*a* is empty. The second inert gas supply unit 145*b* can then allow inert gas to flow from the second inert gas supply unit 145*b* until it is empty, and so forth. Once all inert gas supply units 145*a*-145*c* from the first supply bank 160 have been utilized, the controller 150 can open the solenoid valve 156 on the second supply bank 162 to distribute inert gas to the compressed air-powered pneumatic system 110 until the inert gas supply units on the first supply bank 160 are refilled.

Figure 4:
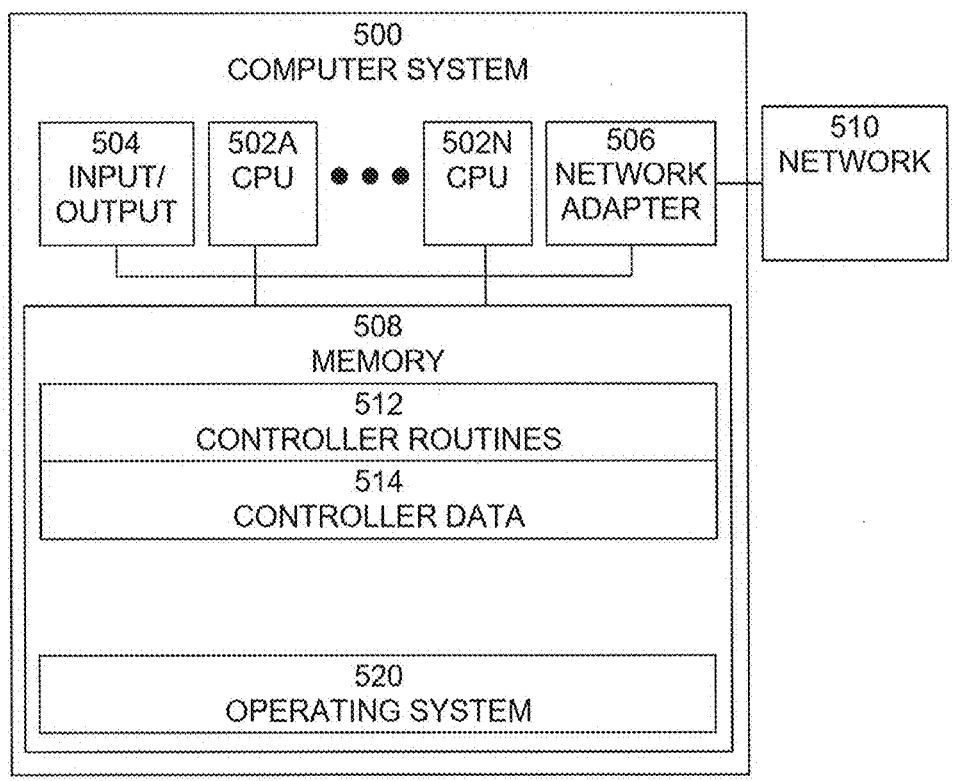
FIG. 4 is a schematic diagram of a computing device for use with the present systems according to one embodiment of the present disclosure.

FIG. 4 is a schematic device of a computing device 500 according to one embodiment of the present disclosure. In some embodiments, the controller 150 includes the computing device 500, as shown in FIG. 4. In another embodiment, the controller 150 is communicatively coupled to the computing device 500. The computing device 500 may be implemented using one or more programmed general-purpose computer systems, such as embedded processors, systems on a chip, personal computers, workstations, server systems, and minicomputers or mainframe computers, or in distributed, networked computing environments. The computing device 500 may include one or more processors (CPUs) 502A-502N, input/output circuitry 504, network adapter 506, and memory 508. CPUs 502A-502N execute program instructions to carry out the functions of the present systems and methods. Typically, CPUs 502A-502N are one or more microprocessors, such as an INTEL CORE® processor.

Input/output circuitry 504 provides the capability to input data to, or output data from, the computing device 500. For example, input/output circuitry 504 may include input devices, such as a graphical user interface, keyboards, mice, touchpads, trackballs, scanners, and analog to digital converters; output devices, such as display screens, video adapters, monitors, and printers; and input/output devices, such as modems.

Network adapter 506 interfaces the computing device 500 with a network 510. Network 510 may be any public or proprietary data network, such as LAN and/or WAN (for example, the Internet). Memory 508 stores program instructions that are executed by, and data that are used and processed by, CPU 502 to perform the functions of the computing device 500. Memory 508 may include, for example, electronic memory devices, such as random-access memory (RAM), read-only memory (ROM), programmable read-only memory (PROM), electrically erasable programmable read-only memory (EEPROM), and flash memory, and electro-mechanical memory, which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, or Serial Advanced Technology Attachment (SATA), or a variation or enhancement thereof, or a fiber channel-arbitrated loop (FC-AL) interface.

Memory 508 may include controller routines 512, controller data 514, and operating system 520. Controller routines 512 may include software routines to perform processing to implement one or more controllers. Controller data 514 may include data needed by controller routines 512 to perform processing. For example, controller routines 512 may include software for analyzing incoming data from the controller 150. In some embodiments, controller routines 512 may include software for interpreting system information from the air compressor 115, such as pressure measurements of the air flow, to determine the operational status of the air compressor 115. In further embodiments, controller routines 512 may include software for transmitting one or more control signals to the valves on the main gas supply line 155 and the first gas supply line 148 of the inert gas supply unit 145. In still further embodiments, controller routines 512 may include software to determine an amount of methane emissions savings by calculating, in real-time, the amount of compressed air used by the pneumatic system 110 and converting the amount of compressed air into an equivalent amount of methane emissions that would have been emitted into the atmosphere had the pneumatic system 110 been operated by natural gas, as described in U.S. Provisional Application No. 63/536,981, filed on Sep. 7, 2023, the disclosure of which is incorporated by reference herein.

FIG. 5 shows a schematic diagram of a supervisory control and data acquisition (SCADA) system 300 according to one embodiment of the present disclosure. In some embodiments, the system 100 may include the SCADA system 300 shown in FIG. 5. SCADA systems are frequently used to monitor and control industrial equipment and processes in such industries as oil and gas production, manufacturing, energy production, transportation, and the like. The SCADA system 300 can be used to gather data in real time from the controller 150 so that the data can be presented in a timely manner.

The SCADA system 300 includes various SCADA devices affiliated with one or more sensors, control devices, or other field instrumentation for gathering data. The SCADA devices may include, for instance, the air compressor 115, the pressure sensor 140, and the pneumatically operated valves 125. Data observed from the various SCADA devices is provided to the controller 150. The controller 150 can communicate with one or more host computers 310, such as data acquisition servers and engineering/operation workstations, through a distributed communication network. In some embodiments, the archived data within the memory of the controller 150 is available to the SCADA network via the Modbus protocol.

The SCADA system 300 may monitor the operational status of the air compressor 115 over a predetermined time period. That is, the monitoring can be performed every minute, hourly, daily, weekly, monthly, yearly, or at any other known interval. In some embodiments, the SCADA system 300 monitors and tracks the operational status of the air compressor 115 every minute. In further embodiments, the SCADA system 300 monitors and tracks the operational status of the air compressor 115 every hour. Alternatively, the monitoring can be performed randomly.

The present disclosure also provides methods for operating a compressed air-powered pneumatic system in the event of an air compressor failure and/or low instrument air pressure. In this embodiment, the method includes operating the air compressor 115 to transmit compressed air through the distribution system 120. As described above, the controller 150 can monitor and interpret the operational status of the air compressor 115. Upon determining that the air compressor 115 has reached the alert mode or the inactive mode, the controller 150 can generate a signal to open the solenoid valve 156 on the main gas supply line 155 to allow inert gas to flow from the inert gas supply unit 145 and into the distribution system 120.

The systems described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the systems in addition to those shown and described herein will become apparent to those skilled in the art from the foregoing description. Such modifications are also intended to fall within the scope of the disclosure. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A compressed air-powered system, comprising:
   an air compressor operatively connected to a conduit, the air compressor configured to transmit compressed air through the conduit;
   an inert gas supply unit operatively connected to the conduit by a gas supply line, wherein the inert gas supply unit comprises a volume of inert gas;
   a valve disposed on the gas supply line, the valve being operable between an open position and a closed position;
   a controller having a processor and a memory, wherein the controller is in communication with the air compressor and the valve and the controller is configured to interpret an operational status of the air compressor as active or inactive,
   a pressure sensor operatively connected to the air compressor and the controller, wherein the pressure sensor is configured to transmit a pressure measurement of the compressed air to the controller,
   wherein the controller is configured to interpret the operational status of the air compressor as inactive when the pressure measurement of the compressed air is below an active pressure set point, and, in response to interpreting the operational status of the air compressor as inactive, the controller is configured to generate a signal to move the valve to the open position to allow inert gas to flow from the inert gas supply unit.

2. The compressed air-powered system of claim 1, wherein the controller is a programmable logic controller (PLC), a remote telemetry unit (RTU), a flow computer, or any combination thereof.

3. The compressed air-powered system of claim 1, wherein the inert gas is selected from the group consisting of nitrogen gas, helium gas, neon gas, argon gas, carbon dioxide, hydrogen, and any combination of the foregoing.

4. The compressed air-powered system of claim 1, wherein the inert gas is nitrogen gas.

5. The compressed air-powered system of claim 1, wherein the controller is configured to interpret an operational status of the air compressor as in alert mode when the pressure measurement of the compressed air is below the active pressure set point and above a critically low pressure set point.

6. The compressed air-powered system of claim 5, wherein, in response to interpreting the operational status of the air compressor as in alert mode, the controller is configured to transmit an alert to an operator of the system.

7. The compressed air-powered system of claim 1, further comprising a human-machine interface (HMI) operatively connected to the controller.

8. The compressed air-powered system of claim 1, wherein the valve is a solenoid valve.

9. A compressed air-powered system, comprising:
   an air compressor operatively connected to a conduit, the air compressor configured to transmit compressed air through the conduit;
   an inert gas supply unit operatively connected to the conduit by a gas supply line, wherein the inert gas supply unit comprises a volume of inert gas;
   a valve disposed on the gas supply line, the valve being operable between an open position and a closed position;
   a controller having a processor and a memory, wherein the controller is in communication with the air compressor and the valve and the controller is configured to interpret an operational status of the air compressor as in an alert mode or an inactive mode,
   wherein:
      in response to interpreting the operational status of the air compressor as in alert mode, the controller is configured to transmit an alert, and
      in response to interpreting the operational status of the air compressor as in the inactive mode, the controller is configured to generate a signal to move the valve to the open position to allow inert gas to flow from the inert gas supply unit.

10. The compressed air-powered system of claim 9, wherein the controller is configured to interpret the operational status of the air compressor as in the alert mode when a pressure measurement of the compressed air is below an active pressure set point and above a critically low pressure set point.

11. The compressed air-powered system of claim 10, wherein the controller is configured to interpret the operational status of the air compressor as in the inactive mode when the pressure measurement of the compressed air is below the critically low pressure set point.

12. The compressed air-powered system of claim 9, further comprising a second inert gas supply unit operatively connected to the conduit by a gas supply line, the second inert gas supply unit configured to allow inert gas to flow therefrom when the inert gas supply unit is empty.

13. The compressed air-powered system of claim 9, further comprising a pressure sensor operatively connected to the air compressor and the controller, wherein the pressure sensor is configured to transmit a pressure measurement of the compressed air to the controller.

* * * * *